United States Patent [19]
Tozaki et al.

[11] Patent Number: 6,085,021
[45] Date of Patent: Jul. 4, 2000

[54] INFORMATION RECORDING MEDIUM APPARATUS FOR RECORDING THE SAME AND APPARATUS FOR REPRODUCING THE SAME

[75] Inventors: Akihiro Tozaki, Tsurugashima; Takao Sawabe, Tokyo-to; Kaoru Yamamoto, Tsurugashima; Ryuichiro Yoshimura, Tokorozawa; Yoshiaki Moriyama, Tsurugashima; Hiroshi Nakamura; Junichi Yoshio, both of Tokorozawa, all of Japan

[73] Assignee: Pioneer Electronic Corporation, Tokyo-to, Japan

[21] Appl. No.: 08/816,941

[22] Filed: Mar. 14, 1997

[30] Foreign Application Priority Data

Mar. 15, 1996 [JP] Japan ........................................ 8-59838

[51] Int. Cl.⁷ ...................................................... H04N 5/92
[52] U.S. Cl. ............................................... 386/68; 386/95
[58] Field of Search ........................... 386/68–70, 81–82, 386/94, 111, 112; 360/60; 380/3, 5, 7, 10, 22; 369/47, 54; H04N 5/76, 5/92, 9/79

[56] References Cited

U.S. PATENT DOCUMENTS

| | | | |
|---|---|---|---|
| 5,023,854 | 6/1991 | Satoh et al. | 369/54 |
| 5,103,317 | 4/1992 | Nomura | 369/54 |
| 5,371,792 | 12/1994 | Asai et al. | 380/3 |
| 5,535,188 | 7/1996 | Dang et al. | 380/3 |
| 5,715,224 | 2/1998 | Fujinami | 369/49 |
| 5,774,314 | 6/1998 | Eggen et al. | 369/34 |
| 5,825,968 | 10/1998 | Nishigaki et al. | 386/94 |

FOREIGN PATENT DOCUMENTS

| | | | |
|---|---|---|---|
| 751 515 A2 | 1/1997 | European Pat. Off. | G11B 20/00 |
| 9-17127 | 1/1997 | Japan . | |

*Primary Examiner*—Thai Tran
*Attorney, Agent, or Firm*—Morgan, Lewis & Bockius LLP

[57] ABSTRACT

An information record medium (1: DVD) has a record track recorded with video information (42, 44) and audio information (43) to be reproduced by a reproducing apparatus (S2). The reproducing apparatus is provided with a read device (80), performs a normal reproduction while relatively moving the read device along the record track and performs a special reproduction, such as a search, a scan and the like, by moving the read device across the record track on the basis of access information to access the video and audio informations. The video and audio informations and control information (41, 51: DSI) comprising the access information are recorded on the record track such that the video, audio and control informations are divided into a plurality of first data group (30: VOBU), each of which is a minimum unit able to be physically accessed, and are divided into a plurality of second data groups (20: CELL), each of which is a unit able to be logically divided in the normal and special reproductions and comprises a series of the first data groups arranged along the record track. Management information (11, PGCI) including a plurality of first reproduction prohibit informations (202), each of which indicates a prohibition of the special reproduction of respective one of the second data groups, is collectively recorded at one portion of the record track.

29 Claims, 13 Drawing Sheets

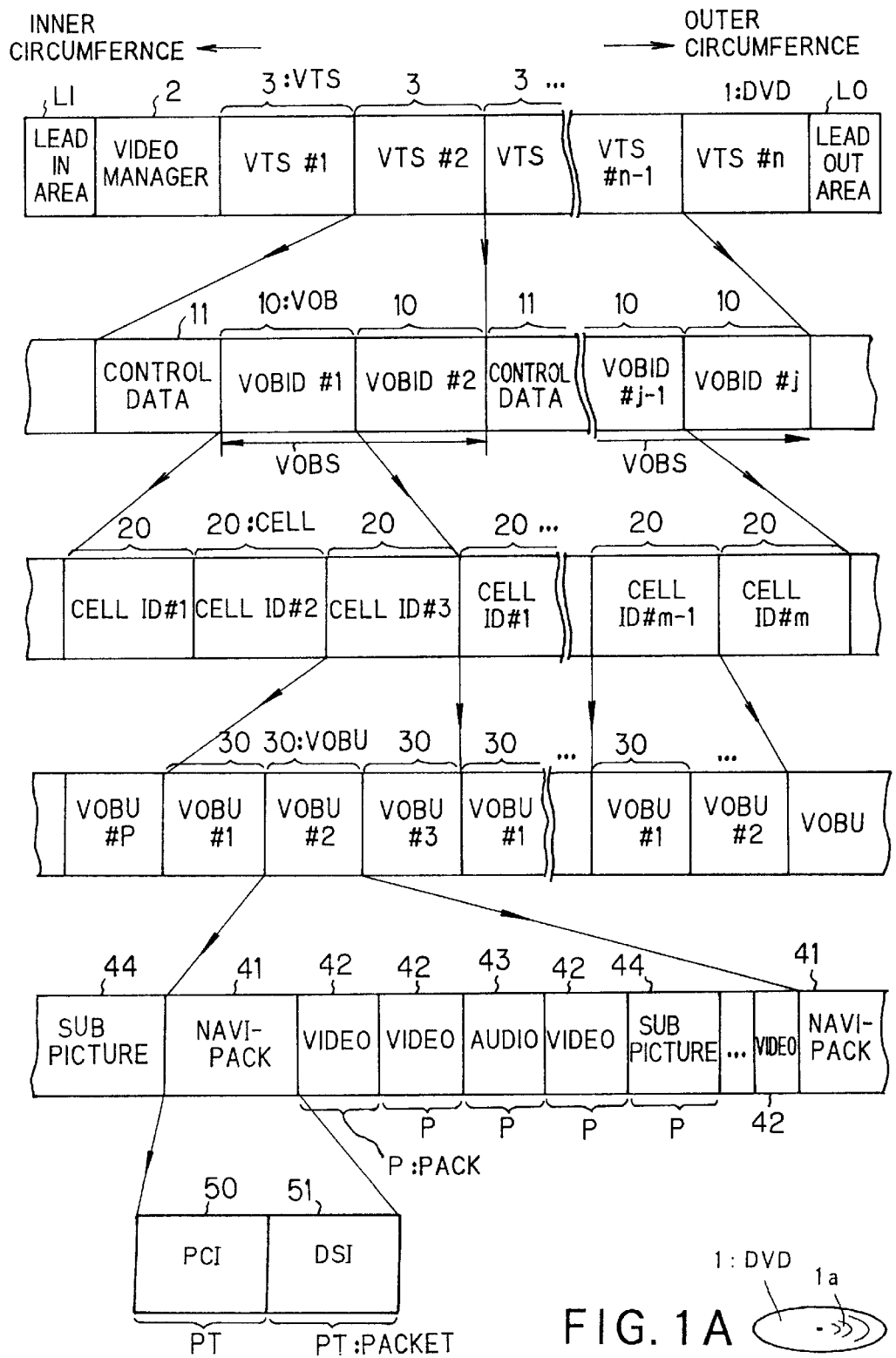
FIG. 1
PHYSICAL STRUCTRE OF RECORD INFORMATION
(PHYSICAL FORMAT)
FIG. 1A

LOGICAL STRUCTRE OF RECORD INFORMATION
(LOGICAL FORMAT)

FIG. 4

CELL REPRODUCTION INFORMATION TABLE IN PGCI

| CELL# | 1 | 2 | 3 | 4 | N |
|---|---|---|---|---|---|
| 1st REPRODUCTION PROHIBIT FLAG | OFF | ON | ON | OFF | OFF |
| REPRODUCTION TIME | 3min | 4min | 2min | 4min | 3min |
| START ADDRESS | 1 | 20 | 50 | 60 | 180 |
| END ADDRESS | 19 | 49 | 59 | 89 | 200 |

CELL ATTRIBUTE INFORMATION IN CELL TABLE

FIG. 6

DATA STRUCTURE OF DSI

| CONTENT | NUMBER OF BYTES |
|---|---|
| DSI GENERAL INFORMATION | 32 BYTES |
| SEAMLESS REPRODUCTION INFORMATION | 146 BYTES |
| SEAMLESS ANGLE INFORMATION | 36 BYTES |
| NAVI-PACK ADDRESS INFORMATION | 152 BYTES |
| SYNCHRONOUS REPRODUCTION INFORMATION | 144 BYTES |
| REPRODUCTION PROHIBIT INFORMATION | 1 BYTE |
| RESEAVED AREA FOR SYSTEM EXPANSION | 506 BYTES |

REPRODUCTION PROHIBIT INFORMATION

211

| | b7 | b6 | b5 | b4 | b3 | b2 | b1 | b0 |
|---|---|---|---|---|---|---|---|---|
| | REPRODUCTION PROHIBIT FLAG | 0 | 0 | 0 | 0 | 0 | 0 | 0 |

212

6,085,021

INFORMATION RECORDING MEDIUM APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, for example, such an interactive reproduction as in a recent game or educational software cannot be performed in which, after a "question" is displayed, different displays, audio outputs and the like are selectively performed depending upon the content of "answer" inputted by the audience (e.g., if the "answer" is correct, the video image display or the audio sound output corresponding to the correct answer is performed, while, if the "answer" is incorrect, the video image display or the audio sound output corresponding to the incorrect answer is performed).

On the other hand, a proposal and a development are being made as for an interactive reproduction of the DVD, as an optical disk in which the memory capacity is improved by about ten times without changing the size of the optical disk itself as compared with the aforementioned conventional CD. It will be possible to make a DVD player perform a search operation and a scan operation (speedy watching and checking operation) in the same manner as a conventional LD player, from its constitutional property. Namely, the DVD player capable of performing the aforementioned interactive reproduction, will have dual functions i.e. both of a function of a reproducing apparatus for simply reproducing the information versus time in the same manner as the conventional LD player and a function of an apparatus for performing the interactive operation in the same manner as a personal computer or a game machine. Therefore, in case of performing the search operation or the scan operation with respect to the DVD capable of the aforementioned interactive reproduction, there will be a certain possibility that, before reproducing the "question", the information corresponding to its correct answer or its incorrect answer may be reproduced. This kind of reproduction is basically contrary to the intention of an author (i.e. a producer of the software) and is further undesirable for the audience (i.e. the user of the software) on the progress of the game or study.

However, there is no proposal or development made as for a DVD technique to prohibit such a reproduction, which is not intended by the author or not desired by the audience. Further, in the technical art of the interactive reproduction of the DVD which has the aforementioned dual functions, the actuality is such that a person having an ordinary skill in this art does not even recognize the problem or subject itself that the reproduction, which is not intended by the author or not desired by the audience upon searching or scanning, should not be performed.

The inventors of the present application have noticed this unknown problem prior to other people, and, in Japanese Patent Application No. Hei. 7-166025, has proposed (i) one reproduction method in which additional information including a reproduction prohibit information, which indicates a reproduction condition for each of predetermined data groups, is added in advance, so that the reproduction of the video data and the audio data, which follow the reproduction prohibit information, is allowed when an actual reproduction condition is judged to satisfy the reproduction condition indicated by the reproduction prohibit information (e.g., a condition that a predetermined reproduction procedure has been completed, a condition that a reproduction of "question" has been completed) by constantly monitoring the actual reproduction condition by the player (i.e. the reproducing apparatus), and (ii) another reproduction method in which additional information including a reproduction prohibit information, which indicates a standard value to permit a reproduction for each of predetermined data groups, is added in advance, and a reproduction permission level, which is determined in dependence on the actual reproducing operation condition with respect to the pertinent software, is given to each of the players (i.e. each of the reproducing apparatuses), so that the reproduction of the video data and the audio data, which follow the reproduction prohibit information, is allowed on the basis of the large or small relationship between the reproduction permission level and the standard value included in the reproduction prohibit information.

However, according to the above mentioned (i) and (ii) methods, the players should memorize the reproduction conditions and the sledding condition of reproduction. Especially, according to the (i) method, the player should monitor whether or not the reproduction of the "question" has been completed, and a specification bit in an internal register is set to "1" at a time of completion. After that, if there is a data group, which has the reproduction prohibit information indicating that the reproduction is to be allowed at the condition of this completion, the player performs a judgment whether the reproduction is allowed or prohibited according to the value of this internal register. Thus, if there are a plurality of branches in the software to be reproduced, there would be necessary a plurality of registers in the bit number corresponding to the number of the branches at least, in order to perform the judgment to allow the reproduction for each branch. On the other hand, according to the (ii) method, it is necessary to equip the player with a register which always stores the reproduction permission level in the non-volatile manner.

Further, according to these (i) and (ii) methods, since the reproduction prohibit information is added to each data group, the fact that the reproduction is prohibited is turned out after the optical pickup is actually moved to the position of the data group and reads out the information therefrom (namely, at a real time). Accordingly, if scanning is performed to the data group which reproduction is prohibited, (a) the scan operation will be suddenly stopped after the optical pickup is moved to this data group, (b) the optical pickup is returned to another data group which reproduction is not prohibited and the reproduction is started therefrom, after the optical pickup is moved once to this data group, (c) a jump is repeatedly performed again and again until finding another data group permitted to be reproduced. The above explained (a) operation is not basically suitable for the primary object of the scan operation, which is to reproduce the information at a position other than the present position on the optical disk. The above explained (b) operation is not basically suitable for the object of the scan operation, which is to move to a forward or backward position away from the present position, since the scan operation to stride over the prohibited portion is not possible in this case. The above explained (c) operation is operatively very inconvenient for the audience, since the interval, in which the reproduction is not performed while the scan operation is performed, becomes long in case that the portion prohibited to be reproduced is rather long. Especially, if such an operation is repeated at a vicinity of a first or last portion of the optical disk, scanning may be stopped as it is.

As explained above, the reproduction methods proposed by the present inventors are not perfect from a view point of the primary function of scanning.

SUMMARY OF THE INVENTION

It is therefore an object of the present invention to provide an information record medium, an apparatus for recording the same, and an apparatus for reproducing the same, which can prevent the information, which should not be reproduced at a time of special reproductions such as a scan operation, a search operation and the like in the interactive reproduction, from being reproduced, by use of a relatively simple construction, and which can smoothly perform the special reproductions.

The above object of the present invention can be achieved by an information record medium having a record track recorded with video information and audio information to be reproduced by a reproducing apparatus. The reproducing apparatus is provided with a read device, performs a normal reproduction while relatively moving the read device along the record track and performs a special reproduction by moving the read device across the record track on the basis of access information to access the video and audio informations. The information record medium comprises a data structure stored in the information record medium and including: the video and audio informations and control information comprising the access information recorded on the record track such that the video, audio and control informations are divided into a plurality of first data group, each of which is a minimum unit able to be physically accessed by the reproducing apparatus and each of which comprises the video, audio and control informations, and are divided into a plurality of second data groups, each of which is a unit able to be logically divided in the normal and special reproductions by the reproducing apparatus and each of which comprises a series of the first data groups arranged along the record track among the first data groups; and management information including a plurality of first reproduction prohibit informations, each of which indicates a prohibition of the special reproduction of respective one of the second data groups by the reproducing apparatus, collectively recorded at one portion of the record track.

According to the information record medium of the present invention, the video, audio and control informations are recorded on the record track such that they are divided into a plurality of first data group and a plurality of second data group, each of which is constructed of a series of first data groups arranged along the record track. Then, the management information, which includes a plurality of first reproduction prohibit informations each of which indicates the prohibition of the special reproduction of respective one of the second data groups, are collectively recorded at one portion of the record track. Therefore, in case that the author wants to prohibit the special reproduction of one specific second data group (e.g. one second data group corresponding to the "answer") among a plurality of second data groups, which consist of one second data group as a logical unit of the video information etc. indicating the "question", another second data group as a logical unit of the video information etc. indicating the "answer" for example, and so on, the corresponding first reproduction prohibit informations are collectively recorded in the management information. Then, later on, by reproducing this management information in advance of the normal and special reproductions by the reproducing apparatus, on the basis of the first reproduction prohibit informations collectively recorded in this reproduced management information, the special reproduction of the second data group, which prohibition is intended by the author, can be speedily and smoothly stopped, if the special reproduction of the pertinent second data group is specified by the audience. Namely, if the special reproduction is a search reproduction for example, without the necessity of moving the read device to a position specified by the search operation, a process to prohibit the search reproduction can be performed speedily and smoothly by referring to the first reproduction prohibit information as for the second data group corresponding to the specified position from the management information which is reproduced in advance. On the other hand, if the special reproduction is a scan reproduction for example, without the necessity of reproducing the information other than the information indicating the position to which the read device is moved by the scan operation, a process to prohibit the scan reproduction can be performed speedily and smoothly by referring to the first reproduction prohibit information as for the second data group corresponding to the position to which the read device is moved, from the management information which is reproduced in advance.

In this manner, according to the present invention, since the first reproduction prohibit informations corresponding to the second data groups respectively, which special reproduction such as a search or scan is prohibited by the author, are collectively stored in the management information, it is possible to collectively reproduce this management information in advance of the normal and special reproductions by the reproducing apparatus, so that the special reproduction of the second data group can be speedily and smoothly stopped on the basis of the first reproduction prohibit information collectively recorded in this management information. As a result, it is possible to prevent the reproduction of the information, which should not be reproduced in the scan or search in the interactive reproduction, by means of a relatively simple construction, and it is further possible to perform a very smooth special reproduction by a speedy process for stopping the reproduction and also by an appropriate stopping process at the time of stopping the reproduction.

In one aspect of the information record medium, the control information in each of the first data groups respectively includes a second reproduction prohibit information, which indicates a prohibition of the special reproduction of respective one of the second data groups including the control information by the reproducing apparatus.

According to this aspect, since the control information constructed in the first data group includes the second prohibition information indicating the prohibition of the special reproduction of the second data group including the pertinent control information respectively, even if the read device tries to reproduce the second data group, which special reproduction is prohibited, due to an error of the reproducing apparatus etc., by reproducing the control information of the first data group to be firstly reproduced, which is a minimum unit able to be physically accessed among them, it is possible to stop the special reproduction of the second data group, which includes the pertinent first data group, on the basis of the second reproduction prohibit information, before reproducing the substantial information such as the video and audio information.

In this manner, according to this aspect, even if the read device tries to specially reproduce the second data group, which special reproduction is prohibited, due to an error of the reproducing apparatus etc., it is possible to stop reproducing the substantial information such as video and audio informations before actually reproducing it, on the basis of the second reproduction prohibit information, so that the reproduction of the information to be specially reproduced can be more certainly prevented.

In another aspect of the information record medium, the management information comprises information indicating a head position and a size of each of the second data groups and a table indicating the first reproduction prohibit informations.

According to this aspect, it is possible to collectively read out the table, in which the information indicating the head position and the size of each of the second data group respectively and the first reproduction prohibit informations are collectively recorded, while separating the table from the video and audio informations.

In this manner, it is possible to perform a more efficient reproduction of the management information.

In another aspect of the information record medium, the video information comprises main video information and sub picture information.

According to this aspect, since the video information comprises the main video information and the sub picture information, the reproduction display of the main video, to which the sub picture such as a subtitle or caption is added or superimposed, is possible, so that a more complicated interactive reproduction can be performed.

The above object of the present invention can be also achieved by an information recording apparatus for recording information onto an information record medium having a record track to be reproduced by a reproducing apparatus. The reproducing apparatus is provided with a read device, performs a normal reproduction while relatively moving the read device along the record track recorded with video information and audio information and performs a special reproduction by moving the read device across the record track on the basis of access information to access the video and audio informations. The information recording apparatus is provided with: an access information generation device for generating the access information corresponding to the video and audio informaitons; a record device for recording the video and audio informations and control information comprising the access information onto the record track such that the video, audio and control informations are divided into a plurality of first data group, each of which is a minimum unit able to be physically accessed by the reproducing apparatus and each of which comprises the video, audio and control informations, and are divided into a plurality of second data groups, each of which is a unit able to be logically divided in the normal and special reproductions by the reproducing apparatus and each of which comprises a series of the first data groups arranged along the record track among the first data groups, and for recording management information including a plurality of first reproduction prohibit informations, each of which indicates a prohibition of the special reproduction of respective one of the second data groups by the reproducing apparatus, collectively at one portion of the record track; and an input device for inputting the first reproduction prohibit informations.

According to the information recording apparatus of the present invention, the access information corresponding to the video and audio informations are generated by the access information generation device. Then, the video, audio and control informations are recorded on the record track by the record device, such that the video, audio and control informations are divided into a plurality of first data groups, each of which is constructed of the video, audio and control informations, and are also divided into a plurality of second data groups, each of which is constituted of a series of first data groups arranged along the record track among the first data groups. When a plurality of first reproduction prohibit informations, each of which indicates a prohibition of respective one of the second data groups, are inputted by the input device, the management information including these inputted first reproduction prohibit informations are recorded collectively to one portion of the record track. Accordingly, the above described information record medium of the present invention can be recorded.

In one aspect of the information recording apparatus, the control information in each of the first data groups respectively includes a second reproduction prohibit information, which indicates a prohibition of the special reproduction of respective one of the second data groups including the control information by the reproducing apparatus; and the input device is constructed to further input the second reproduction prohibit information for each of the second data groups.

According to this aspect, when each second reproduction prohibit information, which indicate the prohibition of the special reproduction of respective one of the second data groups, is inputted by the input device, this inputted second reproduction prohibit information is recorded into the control information in the first data group included in respective one of the second data groups, by the record device. Accordingly, the above described information record medium as one aspect of the present invention can be recorded.

In another aspect of the information recording apparatus, the record device comprises a multiplex device for multiplexing the control information and the management information onto the video and audio informations at a predetermined timing based on the access information.

According to this aspect, at the time of recording by the record device, the control, video and audio informations are multiplexed at the predetermined timing by the multiplex device. Therefore, the information record medium, on which these informations are multiplexed, can be recorded. In this manner, the efficiency of information recording can be improved.

The above object of the present invention can be also achieved by an information reproducing apparatus for reproducing an information record medium. In the information record medium, video information, audio information and control information comprising access information to access the video and audio imformations are recorded on a record track such that the video, audio and control informations are divided into a plurality of first data group, each of which is a minimum unit able to be physically accessed and each of which comprises the video, audio and control informations, and are divided into a plurality of second data groups, each of which is a unit able to be logically divided in normal and special reproductions and each of which comprises a series of the first data groups arranged along the record track among the first data groups. In the information record medium, management information including a plurality of first reproduction prohibit informations, each of which indicates a prohibition of the special reproduction of respective one of the second data groups, is collectively recorded at one portion of the record track. The information reproducing apparatus is provided with: a read device for reading information recorded at a predetermined read position on the record track; a movement device for relatively moving the read device along the record track or across the record track; a reproduction device for reproducing the information read by the read device; a specification device for specifying either one of the normal reproduction and the special reproduction; and a control device for controlling the movement device, the read device and the reproduction device to normally reproduce the video and audio informations by moving the read device along the record track if the normal reproduction is specified by the specification device, and to specially reproduce the video and audio informations by moving the read device across the record track on the basis of the access information if the special reproduction is specified by the specification device, and for controlling at least one of the read device, the movement device and the reproduction device to reproduce the management information in advance of the normal and special reproductions and not to reproduce the second data group, which special reproduction is prohibited by the first reproduction prohibit information included in the management information reproduced in advance.

According to the information reproducing apparatus of the present invention, the information recorded at a predetermined read position on the record track is read by the read device, which is moved by the movement device. Then, this read information is reproduced by the reproduction device. Here, when the normal reproduction is specified by the specification device, the read device is moved along the record track by the movement device and the video and audio informations are normally reproduced under the control of the control device. On the other hand, if the special reproduction is specified by the specification device, the read device is moved across the record track on the basis of the access information, and the video and audio informations are specially reproduced under the control of the control device. Here, according to the first reproduction informations collectively included in the management information, which is reproduced in advance of the normal and special reproductions under the control of the control device, the second data group which special reproduction is prohibited, is not specially reproduced.

Therefore, in case that the author wants to prohibit the special reproduction of one specific second data group among a plurality of second data groups, by collectively recording the corresponding first reproduction prohibit informations in the management information, by reproducing this management information in advance of the normal and special reproductions, on the basis of the first reproduction prohibit informations collectively recorded in this reproduced management information, the special reproduction of the second data group, which prohibition is intended by the author, can be speedily and smoothly stopped, if the special reproduction of the pertinent second data group is specified by the audience. Namely, if the special reproduction is a search reproduction for example, without the necessity of moving the read device to a position specified by the search operation, a process to prohibit the search reproduction can be performed speedily and smoothly by referring to the first reproduction prohibit information as for the second data group corresponding to the specified position from the management information which is reproduced in advance. On the other hand, if the special reproduction is a scan reproduction for example, without the necessity of reproducing the information other than the information indicating the position to which the read device is moved by the scan operation, a process to prohibit the scan reproduction can be performed speedily and smoothly by referring to the first reproduction prohibit information as for the second data group corresponding to the position to which the read device is moved, from the management information which is reproduced in advance.

In one aspect of the information reproducing apparatus, the control device comprises a register for storing a condition that the special reproduction is specified by the specification device as one bit information, and controls such that the second data group is not specially reproduced when the register indicates the special reproduction.

According to this aspect, the control device performs a judgment whether or not the special reproduction is specified by the specification device, by storing the bit information of the minimum unit i.e. just 1 bit in the register. Namely, in case that this register indicates the specification of the special reproduction and that the first reproduction information indicates the prohibition of the special reproduction, the reproduction of the corresponding second data group is prohibited. In this manner, the simplification of the apparatus construction can be promoted.

In another aspect of the information reproducing apparatus, the control device comprises a memory for storing the management information reproduced in advance.

According to this aspect, since the control device stores the management information, which is reproduced in advance of the normal and special reproductions, into the memory device, this management information stored in this memory device can be speedily referred to when the special reproduction is specified, so that it is possible to stop the reproduction even more speedily.

In another aspect of the information reproducing apparatus, the special reproduction comprises a search reproduction in which a position to start a reproduction is specified by the specification device, and the control device stops the search reproduction without controlling the movement device to move the read device if the special reproduction of the second data group including the specified position is prohibited by the first reproduction prohibit information at a time of the search reproduction.

According to this aspect, in case that the special reproduction of the second data group including the position specified at the time of search reproduction is prohibited by the first reproduction prohibit information, without the necessity of moving the read device by the movement device, i.e., without any unnecessary movement of the read device, the search reproduction can be speedily stopped under the control of the control device.

In another aspect of the information reproducing apparatus, the special reproduction comprises a scan reproduction in which a position to start a reproduction by a fast forward or fast backward operation is specified by the specification device, and if the special reproduction of one second data group including the specified position is prohibited by the first reproduction prohibit information after the control device controls the movement device to move the read device to the specified position, the control device controls the movement device to further move the read device, in a direction same as a direction of moving the read device by the movement device to the specified position, to another second data group, which special reproduction is not prohibited by the first reproduction prohibit information, and then controls to start the reproduction therefrom at a time of the scan reproduction.

According to this aspect, at the time of scan reproduction, after the read device is moved to the specified position by the movement device under the control of the control device, if the special reproduction of the second data group including this specified position after moving is prohibited by the first reproduction prohibit information, the read device is further moved, in the direction same as the moving direction until the read device is moved by the movement device to the present position, to reach the second data group which reproduction is not prohibited by the first reproduction prohibit information. Then, the reproduction is started from that reached position. Therefore, without harming the functions such as the speedy fast forward function, the speedy fast backward function and the like as the primary object of the scan operation, it is possible to prevent the time period, during which the reproduction is not performed, from lasting long, and also possible to perform a smooth and natural scan operation, especially as compared with the scan operation in the aforementioned technique in Japanese Patent Application No. Hei. 07-166025, invented by the present inventors.

In another aspect of the information reproducing apparatus, the control information in each of the first data groups respectively includes a second reproduction prohibit information, which indicates a prohibition of the special reproduction of respective one of the second data groups including the control information by the reproducing apparatus, and when the read device is moved to one first data group, the control device controls at least one of the read device, the movement device and the reproduction device to reproduce the control information included in said one first data group in advance of reproducing the video and audio information included in said one first data group, and further controls not to specially reproduce the second data group including said one first data group, if the special reproduction is prohibited by the second reproduction prohibit information included in the reproduced control information.

According to this aspect, when the read device is moved to one first data group under the control of the control device, the control information included in this one first data group is firstly reproduced in advance of reproducing the video and audio informations included in this one first data group. Then, if the special reproduction of the second data group including this one first data group is prohibited by the second reproduction prohibit information included in this reproduced control information, the special reproduction of the second data group including this one first data group is stopped. Therefore, even if the read device tries to reproduce the second data group which reproduction is prohibited, due to an error of the reproducing apparatus etc., the especial reproduction of the second data group including this one first data group can be stopped before reproducing the substantial information such as the video and audio informations on the basis of the second reproduction prohibit information.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1 is a diagram showing a physical structure of record information of a DVD as one embodiment of the present invention;

FIG. 1A is a perspective view of the DVD in FIG. 1;

FIG. 4 is a table showing a data structure of a cell reproduction information table constructed in the DVD in FIG. 1;

FIG. 6 is a diagram showing a data structure of a DSI constructed in the DVD in FIG. 1;

FIG. 7 is a diagram showing a data structure of reproduction prohibit information in the DSI in FIG. 6;

DETAILED DESCRIPTION OF THE PREFERRED EMBODIMENTS

Figure 2:
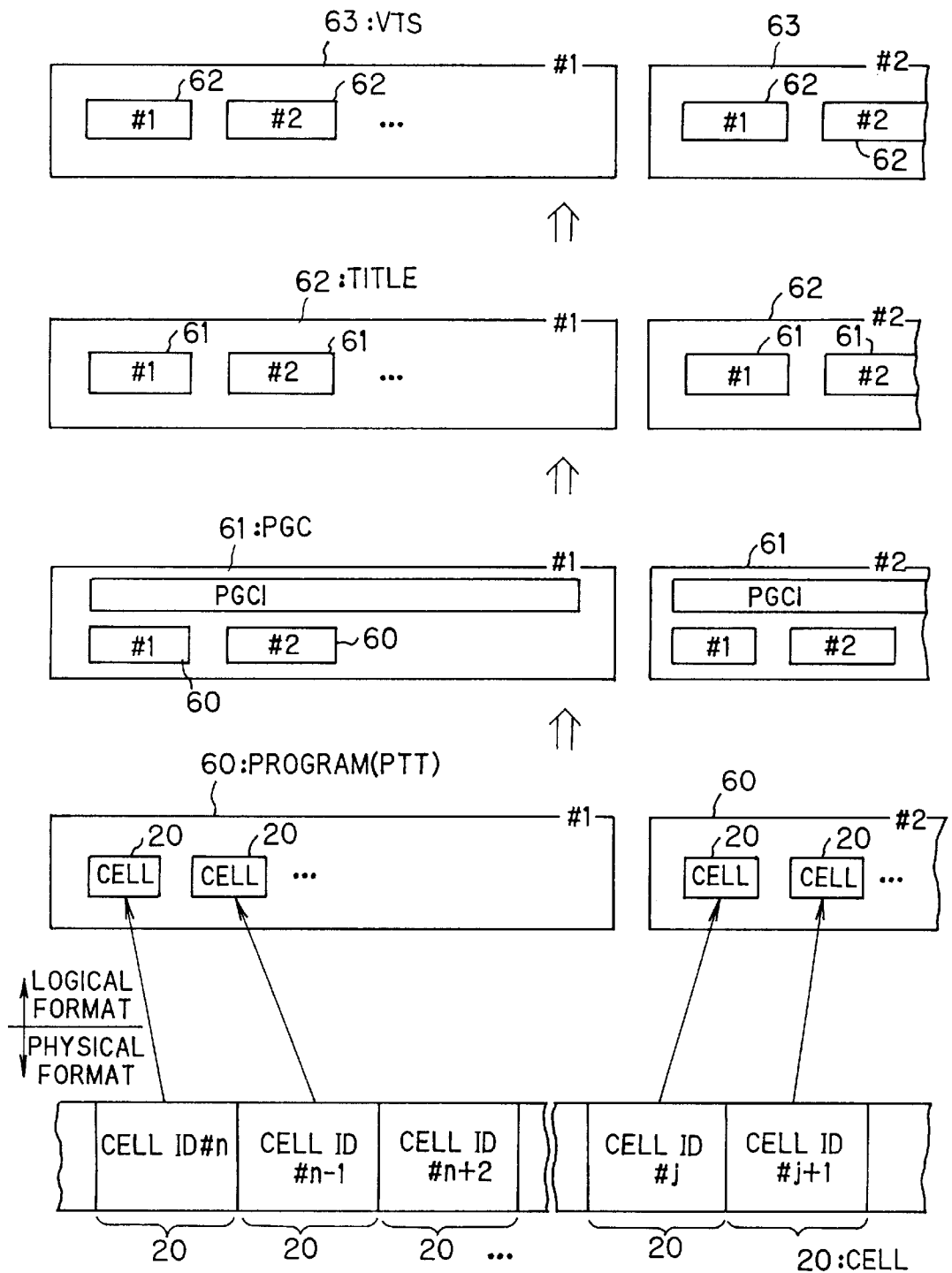
FIG. 2 is a diagram showing a logical structure of the record information of the DVD in FIG. 1.

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

first data group: VOBU (VOB (Video OBject)-Unit)
second data group: cell
management information: cell reproduction information table (in PGCI)
control information: DSI (Data Search Information)
first reproduction
prohibit information: first reproduction prohibit flag (in cell reproduction information table)
second reproduction
prohibit information: second reproduction prohibit flag (in DSI)

(I) Embodiment of Information Record Medium

First of all, a physical structure and a logical structure as well as an operation of a DVD, as one embodiment of the information record medium to which the present invention is applied, will be explained with reference to FIGS. 1 to 3.

At first, a record format of video information and audio information recorded on a record track of the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded along the record track such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

These video, audio and control informations are recorded on a spiral or coaxial record track 1a of the DVD 1 as shown in FIG. 1A.

One VTS 3 is recorded such that it is divided into a plurality of VOBs 10, each of which has an ID number (VOB ID#1, VOB ID#2, ... ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, ... ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, ... ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for the control information; a video pack 42 for the video information; an audio pack 43 for the audio information; and a sub picture pack 44 for the sub picture information. Here, in the video pack 42, a packet including the video data is recorded. In the audio pack 43, a packet including the audio data is recorded. Further, in the sub picture pack 44, a packet including graphics such as a character and a diagram as the sub picture, is recorded. In the video packs 42, which data amount is relatively large as shown in FIG. 1, one or a plurality of GOPs are recorded within one VOB unit 30. The audio pack 43 and the sub picture pack 44 are disposed intermittently between the video packs 42. It is prescribed by a standard specification of the DVD that there are 8 kinds of audio recordable on the DVD 1 while 32 kinds of sub picture recordable on the DVD 1. Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture. The MPEG 2 method employs a variable rate method, in which the data amount included in each GOP is not constant.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 2. The information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the control data 11. Namely, in the DVD 1, the cell 20 constitutes a unit which is logically dividable in the reproduction. For example, the aforementioned "question" corresponds to one cell, the "correct answer" corresponds to another cell, the "incorrect answer" corresponds to another cell, and so on.

To make the explanation clear, the following explanation is made from the lower hierarchical layer in FIG. 2. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT Of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 2. The title 62 included in the VTS 63 has the attributes common to each other. For example, the movies based on one movie but in different languages correspond to the respective titles 62. The information included in one VTS 63 shown in FIG. 2 corresponds to information included in one VTS 3 shown in FIG. 1. Namely, all information included in the logical VTS 63 shown in FIG. 2 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 3.

Figure 3:
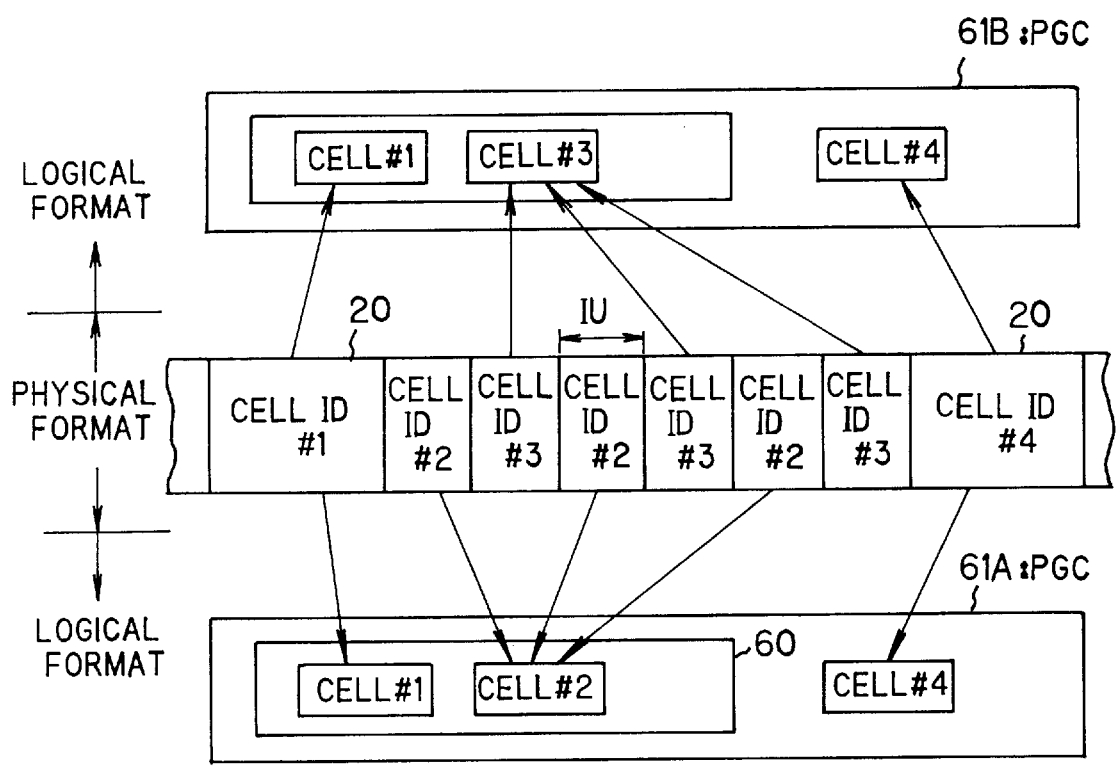
FIG. 3 is a diagram showing a structure of an interleaved unit of the DVD in FIG. 1.

Namely, as shown in FIG. 3, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction" ) of the cell 20 having the ID number 2 and the cell 20 having the ID number 4 may not be possible depending on a capacity of a track buffer of the reproducing apparatus described later.

Therefore, in the case shown in FIG. 3, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Nextly, among the various control information having the above described physical and logical structures, a first reproduction prohibit flag, which constructs one example of a first reproduction prohibit information of the present invention, and a second reproduction prohibit flag, which constructs one example of a second reproduction prohibit information of the present invention will be explained in detail.

At first, the first reproduction prohibit flag is explained with reference to FIGS. 1, 4 and 5.

The PGCI (ProGram Chain Information) included in the control data, which is recorded at the head of the VTS 3 as shown in FIG. 1, is provided with a cell reproduction information table 201 as shown in FIG. 4, which comprises detail information as for a plurality of cells included in the pertinent PGCI. In the present embodiment, one cell is defined to include the video and audio information and the like which are related to one "question" in order to display or sound-output the "question" (e.g. a cell #1). Another cell is defined to include the video and audio information and the like which correspond to a correct answer in order to perform displaying or sound-outputting if the "answer" inputted by the audience is correct (e.g. a cell #2). Another cell is defined to include the video and audio information and the like which correspond to an incorrect answer in order to perform displaying or sound-outputting if the "answer" inputted by the audience is incorrect (e.g. a cell #3). In this manner, by defining the reproduction prohibit flag by a unit of the answer for the question, it is possible to effectively prevent the case where the answer is watched without watching the question at the time of search or scan as explained hereinbelow in detail.

Namely, in FIG. 4, the cell reproduction information table 201 is provided with: a first reproduction prohibit flag 202 which indicates whether or not each cell is possible to be reproduced at the time of performing the special reproduction such as a search, a scan and the like; cell reproduction time information 203 which indicates a reproduction time period of each cell; cell start address information 204 which indicates a start address of the first VOBU in each cell; and cell end address information 205 which indicates a start address of the last VOBU in each cell. Among them, in case that the first reproduction prohibit flag 202 is "OFF" (i.e., the flag is not set), the reproduction of the cell corresponding to the first reproduction prohibit flag 202 is permitted by the unit of cell regardless of the difference between the special reproduction and the normal reproduction, under a reproduction control based on the first reproduction prohibit flag 202 by a system controller of a reproducing apparatus described later. On the other hand, in case that the first reproduction prohibit flag 202 is "ON" (i.e., the flag is set), the reproduction of the cell corresponding to the first reproduction prohibit flag 202 is prohibited by the unit of cell in case of the special reproduction, under the reproduction control based on the first reproduction prohibit flag 202 by the system controller of the reproducing apparatus. Namely, under the reproduction control by the system controller, the reproduction of the cell including the VOBU corresponding to the first reproduction prohibit flag 202 is prohibited when the special reproduction operation, such as a time specified reproduction, a jumping over reproduction, a change in the reproduction speed (including the speed change as for the fast forward and fast backward) and the like as well as the search and the scan, is performed by the audience.

In the example of FIG. 4, although the cell reproduction information table 201 includes the cell start address information 204 and the cell end address information 205, the size (e.g. the number of bytes) of each cell may be included in place of the cell end address information 205. Namely, in this construction with the size, the end address of each cell can be identified.

Therefore, in FIG. 4, for example, the cell #1 is a cell corresponding to the question 1, the cell #2 is a cell corresponding to the correct answer for the question 1, the cell #3 is a cell corresponding to the incorrect answer for the question 1, and the cell #4 is a cell corresponding to the question 2. As a result, since the first prohibit flag 202 is "OFF" for each of the cells corresponding to the questions (i.e. the cell #1 and the cell #4), the reproduction of each of these cells is possible regardless of the difference between the special reproduction and the normal reproduction. On the other hand, the reproduction of the cell which corresponds to the correct or incorrect answer (as an answer for the question) (i.e. the cell #2 or the cell #3) is prohibited in case of the special reproduction, such as the search, the scan and the like, while it is not prohibited in case of the normal reproduction (i.e. a reproduction after finishing the reproduction of the corresponding question).

In FIG. 4, the first reproduction prohibit flag 202 is logically constructed as one line in a two dimensional table in the cell reproduction information table 201.

As a more concrete example of the construction of the first reproduction prohibit flag 202, the first reproduction prohibit flag 202 is constructed as one portion of cell attribute information, which consists of 32 bits and which is logically constructed as one line within the cell reproduction information table 201. Namely, as shown in FIG. 5, cell attribute information 210 is constructed of 32 bits b0 to b31, and the bit b21 as one of those bits is assigned to the first reproduction prohibit flag 202. Here, the first reproduction prohibit flag 202 is OFF in case of "0", and is ON in case of "1".

Figure 5:
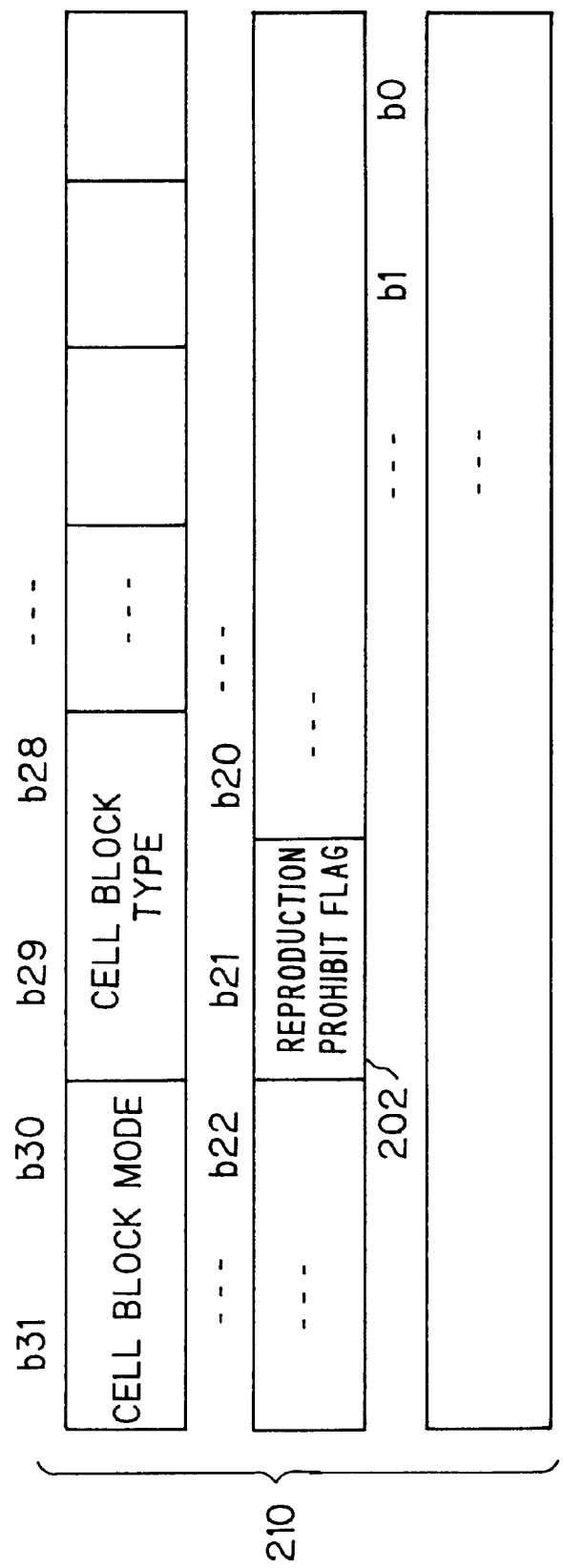
FIG. 5 is a diagram showing cell attribute information of the cell reproduction information table in FIG. 4.

In FIG. 5, the cell block mode assigned to the two bits b31 and b30 indicates that it is not the cell in the pertinent block when their values are "00", indicates that it is the first cell within the pertinent block when their values are "01", indicates that it is the cell within the pertinent block when their values are "10", and indicates that it is the last cell within the pertinent block when their values are "11". The cell block type assigned to the two bits b29 and b28 indicates that it is not the portion of the pertinent block when their values are "00", and indicates that it is the angle block when their values are "01", while the values "10" and "11" are reserved for the system expansion. As for the other bits b27 to b0, other detail information indicating the attribute of the cell may be recorded therein by the bit unit, or they are in an empty condition (e.g. a condition where "0" is continuously arranged) as a reserved area for the system expansion.

Nextly, the second reproduction prohibit flag is explained with reference to FIGS. 1, 6 and 7.

The DSI (Data Search Information) packet 51 included in the navi-pack 41 as shown in FIG. 1 is navigation information having an information content unique for each VOBU 30 to perform a search and a seamless reproduction for the VOBU 30 to which the pertinent navi-pack 41 is disposed at the head thereof. The DSI packet 51 is provided with the second reproduction prohibit flag.

More concretely, for example, the data structure of the DSI packet 51 includes, as shown in FIG. 6: DSI general information which is general information to perform the search with respect to the VOBU; seamless reproduction information to perform the search at the time of seamless reproduction; seamless angle information to perform the angle reproduction in the seamless manner; address information of the navi-pack; the synchronous reproduction information to perform a synchronous reproduction; and reproduction prohibit information 211 of 1 byte including the second reproduction prohibit flag. As shown in FIG. 7, the second reproduction prohibit flag 212 consists of one bit b7 within the reproduction prohibit information 211 of 1 byte comprising 8 bits b0 to b7, while other 7 bits b0 to b6 of the reproduction prohibit information 211 are the reserved area for system expansion (in a condition where "0" is continuously arranged). In case that the second reproduction prohibit flag 212 is "0" (i.e., the flag is not set), any restriction is especially applied to the reproduction control by the system controller of the reproducing apparatus describe later. On the other hand, if the second reproduction prohibit flag 212 is "1" (i.e., the flag is set), the reproduction of the cell including the VOBU corresponding to the pertinent second reproduction prohibit flag 212 is prohibited under the reproduction control by the system controller, when the special operation, such as the time specified reproduction, the jumping over reproduction, the change in the reproduction speed (including the speed change in the fast forward and the fast backward) and the like, is performed by the audience.

As described above in detail, according to the present embodiment, a plurality of first reproduction prohibit flags, which permit or prohibit the special reproduction by the unit of cell, are constructed within the cell reproduction information table provided in the PGCI, while the second reproduction prohibit flag, which permits or prohibits the special reproduction by the unit of cell, is constructed within the DSI packet respectively. Therefore, by referring to the cell reproduction information table constructed in the PGCI at the time of starting the reproduction of each PGCI, the cell, which reproduction is prohibited at the time of the special reproduction such as the search and the scan, can be recognized in advance on the basis of the first reproduction prohibit flag, by the reproducing apparatus described later before actually reproducing the video data etc. in the PGCI. Thus, the search or scan to the cell, which production is prohibited, can be certainly prevented before actually performing the search or scan to the cell (before reproducing the cell). Further, the reproducing apparatus can more reliably prevent the reproduction of the cell which reproduction is prohibited in a real time manner (i.e., immediately after reading in the DSI data) on the basis of the second reproduction prohibit flag, at the time of reading in the DSI data which are included in the navi-pack positioned at the head of the pertinent cell at first, even if the optical pickup jumps into the cell which reproduction is prohibited due to a transient error, an abnormality of the cell reproduction information table or the like. The action and effect of the present embodiment will be more clear from the explanation for the operation of the reproducing apparatus for reproducing the DVD of the present embodiment explained later.

The above described DVD has such a large memory capacity that relatively complicated information in large data amount, which is required for performing a plurality of different displays in accordance with the content of the "answer" inputted by the audience after the display of the "question" for example, can be recorded on a single optical disk. Accordingly, it is effective to apply the above described recording format especially to the DVD 1.

(II) Embodiment of Recording Apparatus

Next, an embodiment of recording apparatus for recording the above mentioned control information, video information and audio information onto the DVD 1 will be explained with reference to FIG. 8.

At first, a construction and an operation of the recording apparatus as the embodiment is explained with reference to FIG. 8.

Figure 8:
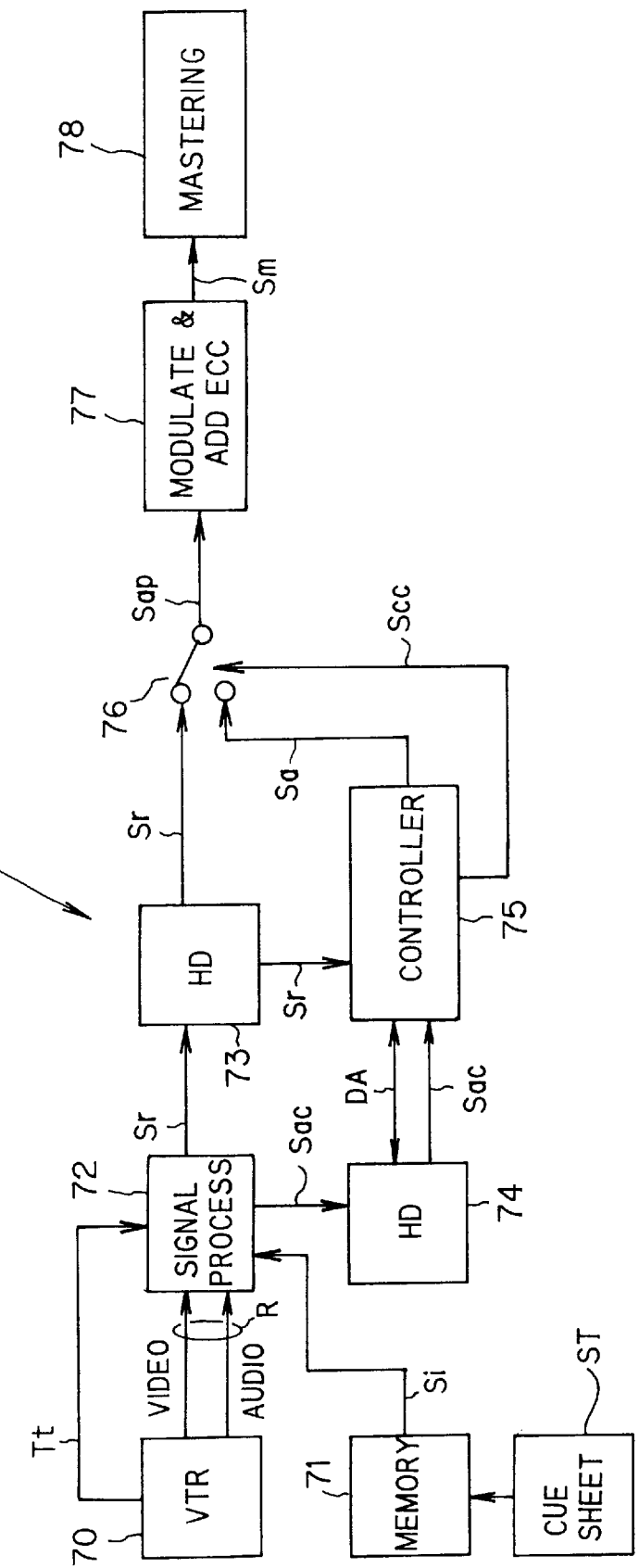
FIG. 8 is a block diagram of an information recording apparatus for recording the DVD in FIG. 1, as another embodiment of the present invention.

As shown in FIG. 8, a recording apparatus S1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which especially ON/OFF of the first reproduction prohibit flag and ON/OFF of the second reproduction prohibit flag for every cell etc. as for each partial record information Pr are written. Then, the memory 71 outputs it as a content information signal Si on the basis of a request from the signal process unit 72.

Then, the signal process unit 72 generates and outputs an access information signal Sac corresponding to the partial record information Pr with referring to a time code Tt, on the basis of the time code Tt corresponding to the record information R outputted from the VTR 70 and the content information signal Si outputted from the memory 71. Then, the access information signal Sac is temporarily stored in the hard disk device 74.

The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74. This is because there may be a control signal, which content is determined in dependence upon a generation result of the compressed multiplexed signal Sr among various control signals. On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed Sap. If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Lead Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

Nextly, the detail operation of the recording apparatus S1 for recording the first and second reproduction prohibit flags onto the master disk is explained.

At first, the information selection signal Scc to select the additional information signal Sa is outputted by the controller 75 at a timing corresponding to the access information signal Sac generated on the basis of the content information Si, which is inputted by the cue sheet ST and which specifies the ON/OFF of the first and second reproduction prohibit flags for each cell. Thus, the multiplexer 76 is switched to the side for the additional information signal Sa. Then, the first reproduction prohibit flag is inputted to the modulator 77 as one portion of the additional information signal Sa, which constructs the cell reproduction information table within the PGCI, and is further inputted to the mastering device 78 as one portion of the disk record signal Sm. Then, the DSI data, which include the second reproduction prohibit flag and which constitute the navi-pack 41 of the first VOBU of the first VOB shown in FIG. 1, are inputted to the modulator 77, and are inputted to the mastering device 78 as one portion of the disk record signal Sm in the same manner. Then, the information selection signal Scc to select the compressed multiplexed signal Sr is outputted by the controller 75, so that the multiplexer 76 is switched to the side for the compressed multiplexed signal Sr. Then, the video pack, the audio pack and the sub picture pack of the pertinent VOBU are inputted successively as the information added compressed multiplexed signal Sap to the modulator 77. This operation is repeatedly performed for a plurality of VOBUs, and is further repeatedly performed for a plurality of VTSs.

As a result of the above, according to the present embodiment, it is possible to produce the master disk in which a plurality of first reproduction prohibit flags to respectively permit or prohibit the special reproduction by the unit of cell within the cell reproduction information table provided in the PGCI, and in which the second reproduction prohibit flag to permit or prohibit the special reproduction also by the unit of cell is constructed for each DSI data.

(III) Embodiment of Reproducing Apparatus

Next, an embodiment of reproducing apparatus for reproducing the information recorded on the DVD 1 by the above mentioned recording apparatus will be explained with reference to FIGS. 9 to 14.

At first, a construction and an operation of the reproducing apparatus as the embodiment is explained with reference to FIG. 9.

Figure 9:
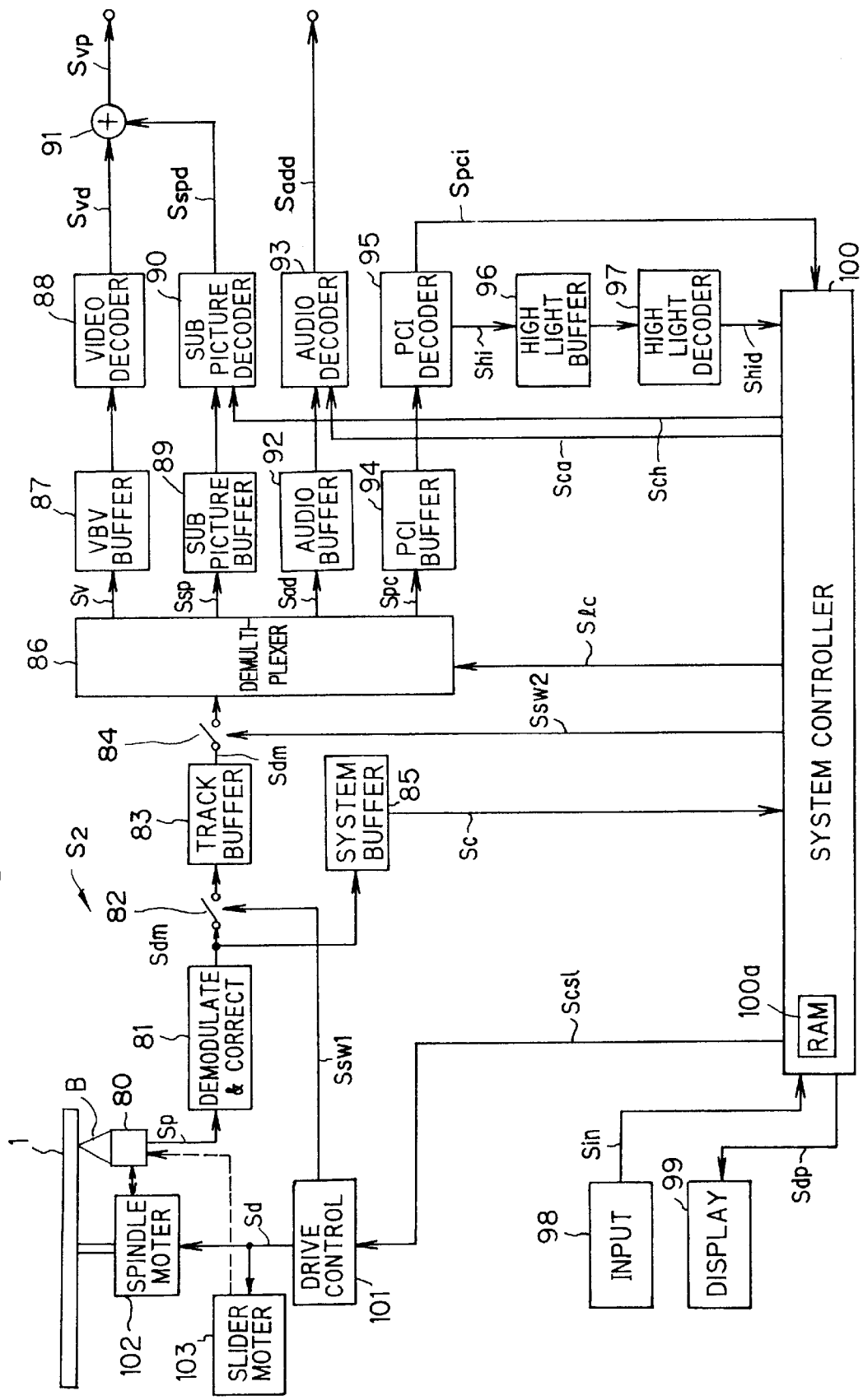
FIG. 9 is a block diagram of an information reproducing apparatus for reproducing the DVD in FIG. 1, as another embodiment of the present invention.

As shown in FIG. 9, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 9 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the language selection signal Slc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scs1 corresponding to the track jump process, to the drive controller 101, when it detects by the control signal Sc etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 9), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

In the present embodiment, the system controller 100 is especially provided with an operation condition register such as a RAM 110a, which indicates a current operation condition of the reproducing apparatus S2. The operation condition register has a specific bit which is set to "1" in case that the special reproduction such as the search or scan is being performed. Therefore, it is enough to perform the control to prohibit the special reproduction only when this specific bit is set to "1" . Further, the system controller 100 is constructed to store the cell reproduction information table described in the PGCI (refer to FIG. 4) to an internal memory device such as a RAM (Random Access Memory) 110a in advance of reproducing each PGC. Therefore, it is possible for the controller 100 to judge whether or not the special reproduction for each cell is prohibited without actually reproducing each cell.

Next, the search operation and the scan operation based on the first and second reproduction prohibit flags by the system controller 100 especially related to the present invention in the reproducing apparatus S2 is explained.

At first, the search operation is explained with reference to FIG. 10.

Figure 10:
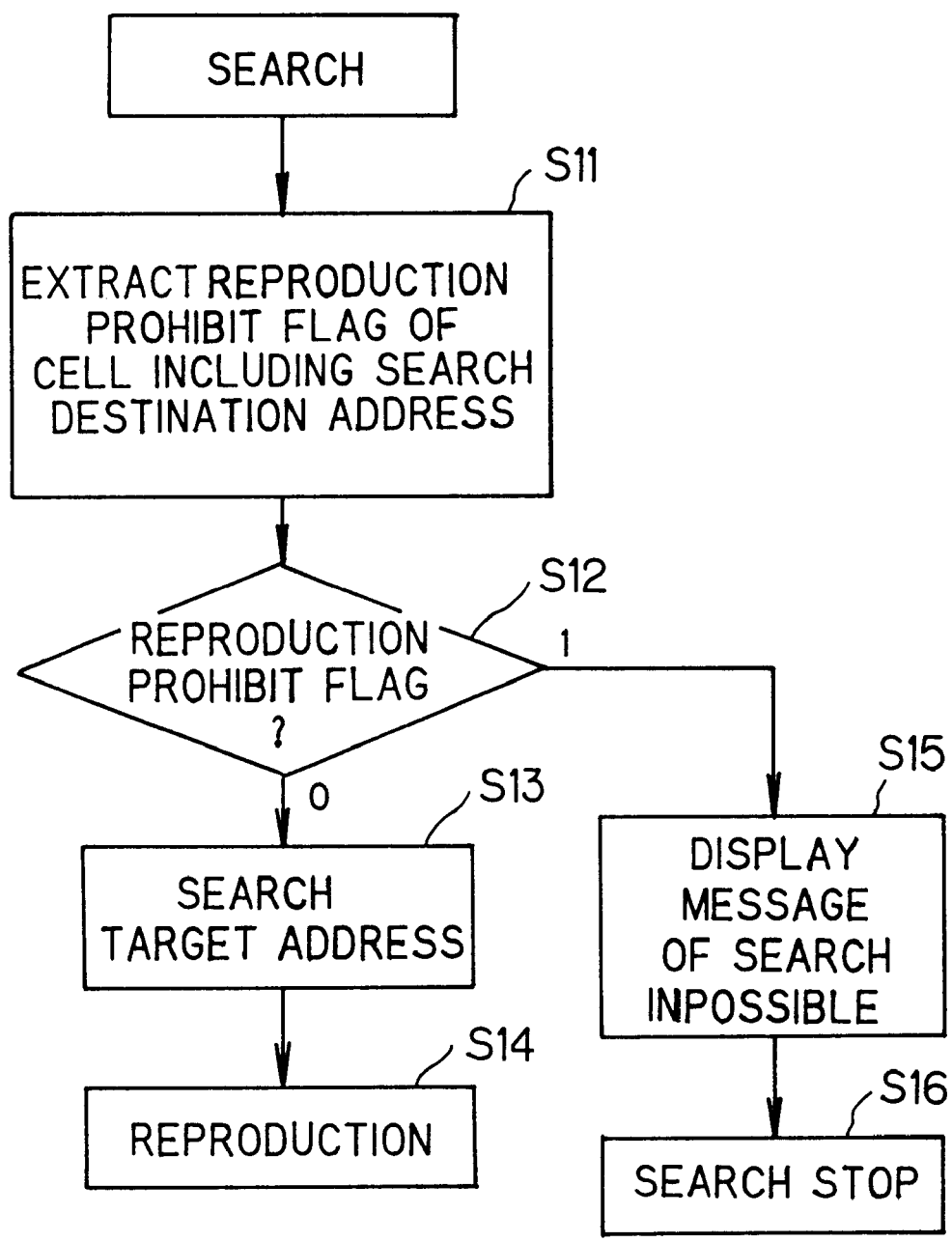
FIG. 10 is a flow chart showing a search operation of the information reproducing apparatus in FIG. 9.

In FIG. 10, in advance of the search operation, upon starting the reproduction of each VTS, the system controller 100 reads the cell reproduction information table as shown in FIG. 4, which owned by the PGCI data included in the control data of the pertinent VTS in advance, and stores it to the internal memory device such as a RAM 100a.

In this condition, when a search, such as a chapter search, a time search or the like, is specified to the reproducing apparatus S2 through the input unit 98 by the audience, the specific bit, which indicates that the special reproduction is being performed, of the operation condition register owned by the controller 100, is set to "1". Then, the system controller 100 extracts the first reproduction prohibit flag as for the cell, which corresponds to the chapter or time at the specified search destination, from the cell reproduction information table (step S11). Next, the system controller 100 judges whether the extracted first reproduction prohibit flag is "1 (ON)" or "0(OFF)" (step S12). Here, if the first reproduction prohibit flag is "0", since the reproduction of the cell in the search operation or the scan operation is permitted, the flow branches to a step S13, where the search target address is searched under the control of the system controller 100 (step S13). After that, the reproduction of the video information and the audio information is started from the cell corresponding to the searched chapter or time (step S14). On the other hand, if the first reproduction prohibit flag is "1", since the reproduction of the cell in the search operation or the scan operation is prohibited, the flow branches to a step S15, where a message meaning that the pertinent search is impossible e.g., "You cannot watch the answer before answering the question!" is displayed, for example, on the display unit 99 or the CRT display device not illustrated under the control of the system controller 100 (step S15). Then, the specified search operation is stopped (step S16).

In this manner, according to the present embodiment, by referring to the first reproduction prohibit flag, which is constructed in the cell reproduction information table, in advance of moving the optical pickup 80, the search can be speedily and certainly stopped without moving the optical pickup 80 to the search destination, which is advantageous. By this, for example, it is possible to prevent a reproduction, which is contrary to the intention of the author and unpleasant for the audience e.g., such a reproduction that the audience watches the "answer" before watching the "question" while searching a certain "question" in the interactive reproduction.

Further, according to the present embodiment, the second reproduction prohibit flag is provided within the DSI data in the navi-pack, which is read in prior to the reproduction of the video and audio information, for each VOBU as a minimum unit able to physically access. Thus, even if the optical pickup 80 jumps into one cell, which reproduction is prohibited by the first reproduction prohibit flag and which is different from another cell of the search target, due to an erroneous operation of the reproducing apparatus S2, it is still possible to prohibit the erroneous reproduction of said one cell at a real time manner (i.e., right after the pickup 80 has moved to said one cell) by referring to the second reproduction prohibit flag, which is constructed in the DSI data in the navi-pack provided for each VOBU, in advance of actually reproducing the video and audio information in the cell, so that it is possible to certainly prevent such an occasion that the cell which reproduction is prohibited is reproduced at the time of search operation.

Nextly, the scan operation is explained with reference to FIG. 11.

Figure 11:
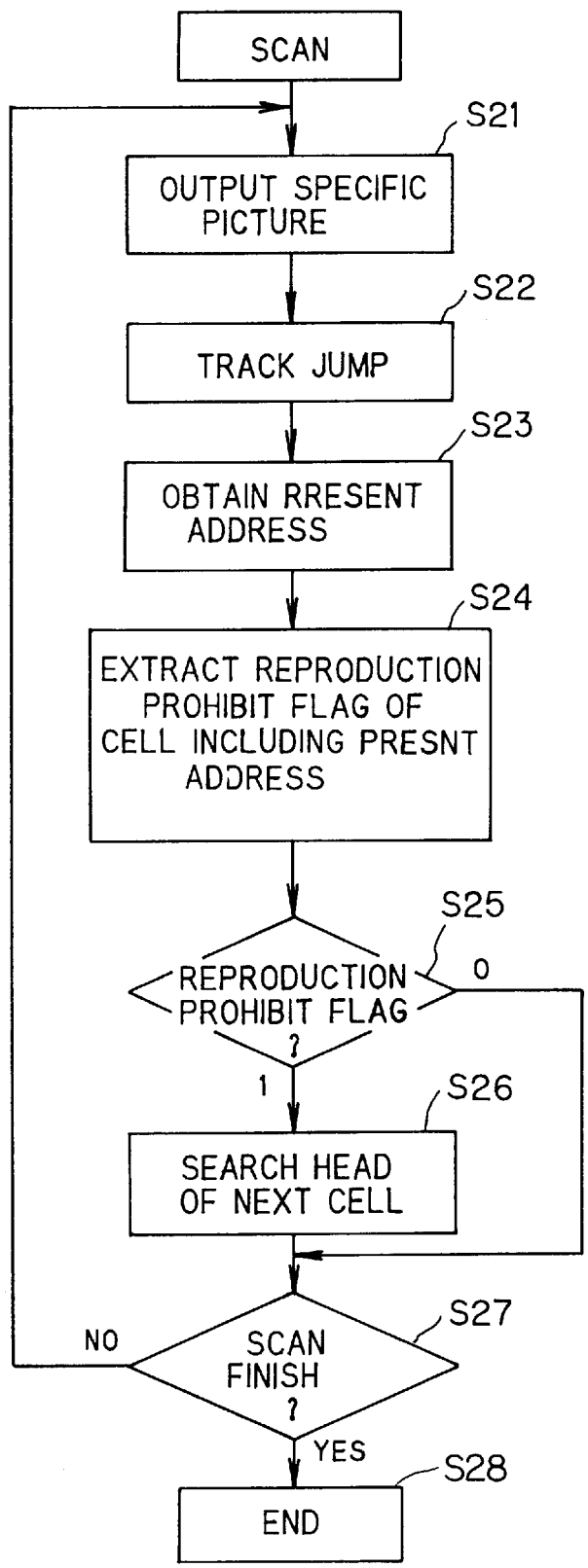
FIG. 11 is a flow chart showing a scan operation of the information reproducing apparatus in FIG. 9.

In FIG. 11, the system controller 100 reads the cell reproduction information table as shown in FIG. 4, which is owned by the PGCI included in the control data, and stores it into the internal memory device such as a RAM 100a in advance of reproducing each VTS.

In this condition, when the scan operation, such as the fast forward scan, the fast backward scan or the like, is specified to the reproducing apparatus S2 through the input unit 98 by the audience, the specific picture (e.g. the I picture), which is predetermined as the picture to be displayed at the time of scanning, is image-outputted under the control of the system controller 100 (step S21). At this time especially, the specific bit of the operation condition register, which is owned by the system controller 100 and which indicates that the special reproduction is being performed, is set to "1".

Then, the track jump is performed in accordance with the direction of the scan (step S22), and the present address is obtained by the unit of VOBU (step S23). Namely, the navi-pack of the VOBU, which is to be reproduced after jumping, is read, and the head address of the VOBU is recognized by the system controller 100. Then, the system controller 100 performs the following operations, since the specific bit of the operation condition register, which indicates that the special reproduction is being performed, is set to "1" in this occasion. Namely, the first reproduction flag of the cell including this present address is extracted from the cell reproduction information table, which has been read in and stored prior to the reproduction (step S24). Then, the system controller 100 judges whether the extracted first reproduction prohibit flag is "(1(ON)" or "0(OFF)" (step S25). If the first reproduction prohibit flag is "0" here, since the reproduction of the cell in the search operation and the scan operation is permitted, the flow branches to a step S27, where it is judged whether or not the scan finish is instructed (step S27). If the scan finish is instructed at this step S27, the scan is ended and the normal reproduction is performed form the cell (step S28). On the other hand, if the scan finish is not instructed at the step S27 (step S27: NO), namely if the scan is again instructed, the flow returns to the step S21.

On the other hand, if the first reproduction prohibit flag is "1" at the step S25, since the reproduction of the cell in the search operation and the scan operation is prohibited, the flow branches to a step S26, where the head of the next cell is searched by track-jumping to the head address of the cell, which is nextly positioned in the direction of scanning and which first reproduction flag is "0", under the control of the system controller 100 (step S26). Then, the flow proceeds to the step S27.

Figure 12:
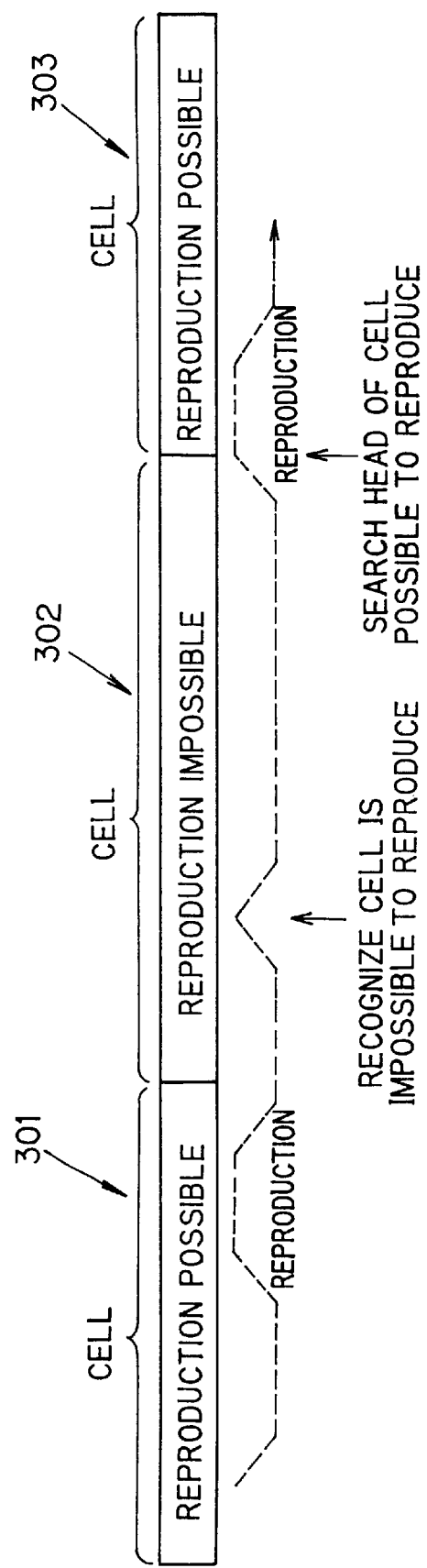
FIG. 12 is a conceptual diagram showing the scan operation of the information reproducing apparatus in FIG. 9.

The operation at this step S26 is schematically illustrated in FIG. 12.

As shown in FIG. 12, if the audience starts scanning in the middle of the reproduction of a cell 301, which reproduction is not prohibited (possible), and if the optical pickup is moved to a cell 302, which reproduction is prohibited (impossible), in the middle of the scan operation, since the fact that the reproduction of the cell 302 is prohibited is speedily judged on the basis of the cell reproduction information table, so that a cell 303, which is nextly positioned and which reproduction is not prohibited (possible), is automatically and immediately searched. In this manner, according to the present embodiment, it is possible to hardly harm the function of the speedy fast forward and the speedy fast backward as a primary object of the scan operation, and it is also possible to prevent the time period, in which the reproduction is ceased, from continuing for a long time, and perform very much speedy, smooth and natural scan operation, as compared with the scan operation based on the aforementioned art in the Japanese Patent Application No. Hei. 07-166025 invented by the present inventors.

In this way, according to the present embodiment, by referring to the first reproduction prohibit flag constructed in the cell reproduction information table for each time when the optical pickup 80 is moved by the scan operation, it is possible to search only the cells, which reproductions are not prohibited, so that the present embodiment is convenient. By this, for example, in the interactive reproduction, it is possible to safely and speedily scan only the "questions" while it is possible to prevent the reproduction contrary to the intention of the author and unpleasant for the audience e.g., such a reproduction that the audience watches the "answer" before watching the "question" while scanning, and also possible to perform a smooth scan operation, which usage is very comfortable for the audience.

Further, according to the present embodiment, the second reproduction prohibit flag is provided within the DSI data in the navi-pack, which is read in prior to the reproduction of the video and audio information, for each VOBU as a minimum unit able to be physically accessed. Thus, even if the optical pickup 80 jumps into one cell, which reproduction is prohibited by the first reproduction prohibit flag and which is different from another cell of the scan object, due to an erroneous operation of the reproducing apparatus S2, it is still possible to prohibit the erroneous reproduction of said one cell at a real time manner (i.e., right after the pickup 80 has moved to said one cell) by referring to the second reproduction prohibit flag, which is constructed in the DSI data in the navi-pack provided for each VOBU, in advance of actually reproducing the video and audio information in said one cell. Therefore, it is possible to more certainly prevent such an occasion that the cell which reproduction is prohibited is reproduced at the time of scan operation.

Further, since there are provided two different kinds of reproduction prohibit flags to prohibit the reproduction by the same unit of cell in this manner, by setting the second reproduction prohibit flag in the DSI to ON (permission condition) and by setting the first reproduction flag for just one PGC in the PGCI to ON (prohibit condition) and setting the first reproduction flag for other PGCs in the same PGCI to OFF (permission condition), it is possible to either permit or prohibit the reproduction of one cell at the time of scan or search, in case of conducting the aforementioned alternative usage of the cell, which is convenient. Namely, for example, a teacher or parent reproduces the PGC in which only the correct answers can be speedily checked without watching the questions, while a student or child reproduces another PGC in which the answers cannot be watched without completing the questions respectively, which is convenient.

Finally, the interactive reproduction to perform different displays in correspondence with the content of the "answer" inputted by the audience after the display of the "question" according to the present embodiment operating as mentioned above, is schematically explained with reference to FIGS. 13 and 14.

In this reproduction, if the "answer" is correct, such a video image that a commentary is added to a display picture of "It is correct" for example, is displayed as a video image corresponding to the correct answer, and at the same time, an audio sound such as an electric chime sound of "Ping-Pong", a synthetic sound voice of reading loudly the displays text and the like is sound-outputted.

Figure 13:
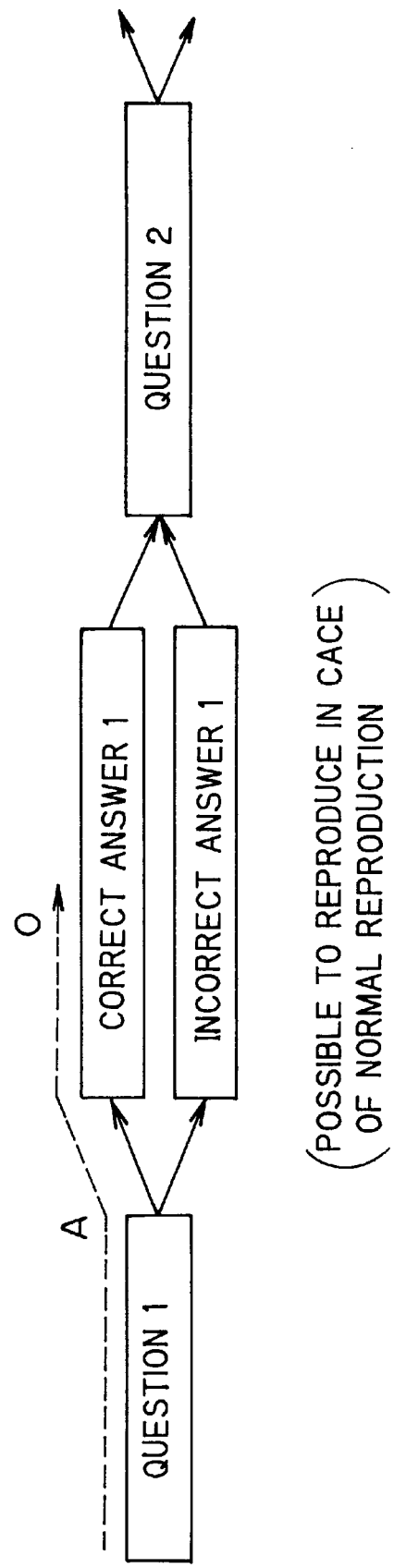
FIG. 13 is a conceptual diagram showing a normal reproduction operation of the information reproducing apparatus in FIG. 9.

FIG. 13 shows a flow of the reproduction process in case of the normal reproduction. In this case, the cell corresponding to the correct answer 1 and the cell corresponding to the incorrect answer 1 are prohibited in their special reproduction such as the search operation, the scan operation and the like by the first and second reproduction prohibit flags. However, since this is the case of the normal reproduction, after the question is reproduced, the cell corresponding to the correct answer 1 or the cell corresponding to the incorrect answer 1 is reproduced depending upon the content of the "answer" for the reproduced question.

Figure 14:
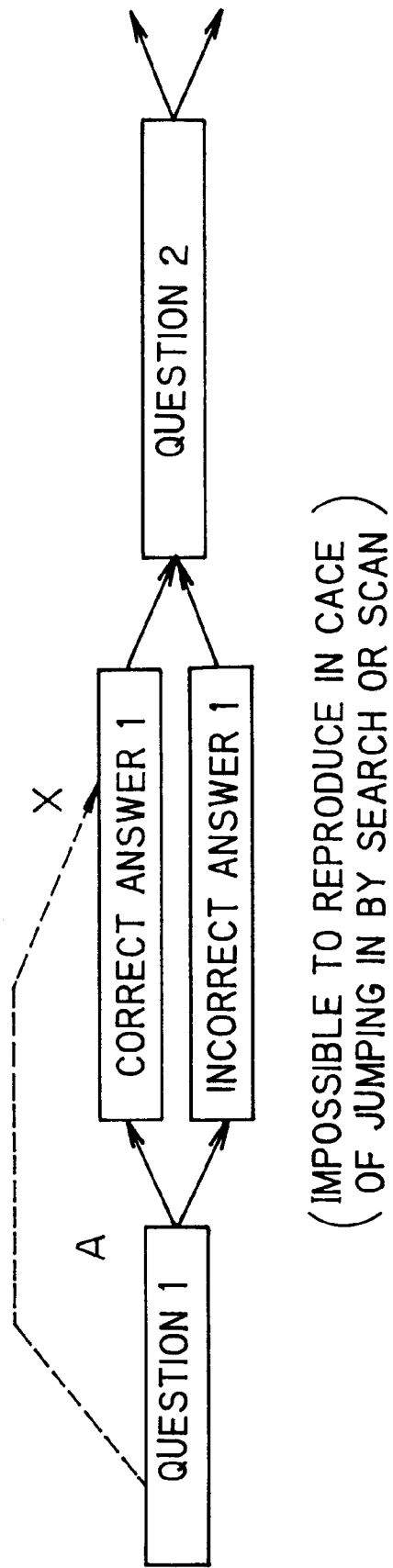
FIG. 14 is a conceptual diagram showing a special reproduction operation of the information reproducing apparatus in FIG. 9.

FIG. 14 shows a flow of the reproduction process in case that the search operation or the scan operation is started while the question 1 is being reproduced. Since the special reproduction, such as the search operation or the scan operation, of the cell corresponding to the correct answer 1 or the incorrect answer 1 is prohibited by the first and second reproduction flags, the cell corresponding to the correct answer 1 or the cell corresponding to the incorrect answer 1 is not reproduced by the scan or search operation. Therefore, in this case, the head of the next question 2 is searched or scanned under the control of the system controller 100, or the search or scan operation is stopped.

As clearly understand from FIGS. 13 and 14, the interactive reproduction, which is intended by the author and pleasant for the audience, can be performed according to the present embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information record medium having a record track recorded with video information and audio information to be reproduced by a reproducing apparatus, which comprises a read means, performs a normal reproduction while relatively moving said read means along said record track and performs a special reproduction by moving said read means across said record track on the basis of access information to access said video and audio informations, said information record medium comprising a data structure stored in said information record medium and including:

said video and audio informations and control information comprising said access information recorded on said record track such that said video, audio and control informations are divided into a plurality of first data group, each of which is a minimum unit able to be physically accessed by said reproducing apparatus and each of which comprises said video, audio and control informations, and are divided into a plurality of second data groups, each of which is a unit able to be logically divided in the normal and special reproductions by said reproducing apparatus and each of which comprises a series of said first data groups arranged along said record track among said first data groups; and management information including a plurality of first reproduction prohibit informations, each of which indicates a prohibition of the special reproduction of respective one of said second data groups by said reproducing apparatus, collectively recorded at one portion of said record track.

2. An information record medium according to claim 1, wherein said control information in each of said first data groups respectively includes a second reproduction prohibit information, which indicates a prohibition of the special reproduction of respective one of said second data groups including said control information by said reproducing apparatus.

3. An information record medium according to claim 1, wherein said management information comprises information indicating a head position and a size of each of said second data groups and a table indicating said first reproduction prohibit informations.

4. An information record medium according to claim 1, wherein said video information comprises main video information and sub picture information.

5. An information recording apparatus for recording information onto an information record medium having a record track to be reproduced by a reproducing apparatus, which comprises a read means, performs a normal reproduction while relatively moving said read means along said record track recorded with video information and audio information and performs a special reproduction by moving said read means across said record track on the basis of access information to access said video and audio informations, said information recording apparatus comprising:

an access information generation means for generating said access information corresponding to said video and audio informaitons;

a record means for recording said video and audio informations and control information comprising said access information onto said record track such that said video, audio and control informations are divided into a plurality of first data group, each of which is a minimum unit able to be physically accessed by said reproducing apparatus and each of which comprises said video, audio and control informations, and are divided into a plurality of second data groups, each of which is a unit able to be logically divided in the normal and special reproductions by said reproducing apparatus and each of which comprises a series of said first data groups arranged along said record track among said first data groups, and for recording management information including a plurality of first reproduction prohibit informations, each of which indicates a prohibition of the special reproduction of respective one of said second data groups by said reproducing apparatus, collectively at one portion of said record track; and an input means for inputting said first reproduction prohibit informations.

6. An information recording apparatus according to claim 5, wherein:

said control information in each of said first data groups respectively includes a second reproduction prohibit information, which indicates a prohibition of the special reproduction of respective one of said second data groups including said control information by said reproducing apparatus; and said input means is constructed to further input said second reproduction prohibit information for each of said second data groups.

7. An information recording apparatus according to claim 5, wherein said record means comprises a multiplex means for multiplexing said control information and said management information onto said video and audio informations at a predetermined timing based on said access information.

8. An information reproducing apparatus for reproducing an information record medium, in which video information, audio information and control information comprising access information to access said video and audio imformations are recorded on a record track such that said video, audio and control informations are divided into a plurality of first data group, each of which is a minimum unit able to be physically accessed and each of which comprises said video, audio and control informations, and are divided into a plurality of second data groups, each of which is a unit able to be logically divided in normal and special reproductions and each of which comprises a series of said first data groups arranged along said record track among said first data groups, and in which management information including a plurality of first reproduction prohibit informations, each of which indicates a prohibition of the special reproduction of respective one of said second data groups, is collectively recorded at one portion of said record track, said information reproducing apparatus comprising:

a read means for reading information recorded at a predetermined read position on said record track;

a movement means for relatively moving said read means along said record track or across said record track;

a reproduction means for reproducing the information read by said read means;

a specification means for specifying either one of the normal reproduction and the special reproduction; and a control means for controlling said movement means, said read means and said reproduction means to normally reproduce said video and audio informations by moving said read means along said record track if the normal reproduction is specified by said specification means, and to specially reproduce said video and audio informations by moving said read means across said record track on the basis of said access information if the special reproduction is specified by said specification means, and for controlling at least one of said read means, said movement means and said reproduction means to reproduce said management information in advance of the normal and special reproductions and not to reproduce said second data group, which special reproduction is prohibited by said first reproduction prohibit information included in said management information reproduced in advance.

9. An information reproducing apparatus according to claim 8, wherein said control means comprises a register for storing a condition that the special reproduction is specified by said specification means as one bit information, and controls such that said second data group is not specially reproduced when said register indicates the special reproduction.

10. An information reproducing apparatus according to claim 8, wherein said control means comprises a memory for storing said management information reproduced in advance.

11. An information reproducing apparatus according to claim 8, wherein:

the special reproduction comprises a search reproduction in which a position to start a reproduction is specified by said specification means;

said control means stops the search reproduction without controlling said movement means to move said read means if the special reproduction of said second data group including the specified position is prohibited by said first reproduction prohibit information at a time of the search reproduction.

12. An information reproducing apparatus according to claim 8, wherein:

the special reproduction comprises a scan reproduction in which a position to start a reproduction by a fast forward or fast backward operation is specified by said specification means; and if the special reproduction of one second data group including the specified position is prohibited by said first reproduction prohibit information after said control means controls said movement means to move said read means to the specified position, said control means controls said movement means to further move said read means, in a direction same as a direction of moving said read means by said movement means to the specified position, to another second data group, which special reproduction is not prohibited by said first reproduction prohibit information, and then controls to start the reproduction therefrom at a time of the scan reproduction.

13. An information reproducing apparatus according to claim 8, wherein:

said control information in each of said first data groups respectively includes a second reproduction prohibit information, which indicates a prohibition of the special reproduction of respective one of said second data groups including said control information by said reproducing apparatus; and when said read means is moved to one first data group, said control means controls at least one of said read means, said movement means and said reproduction means to reproduce said control information included in said one first data group in advance of reproducing said video and audio information included in said one first data group, and further controls not to specially reproduce said second data group including said one first data group, if the special reproduction is prohibited by said second reproduction prohibit information included in said reproduced control information.

14. An information record medium to be reproduced by a reproducing apparatus, the information record medium comprising:

a plurality of first data groups each including navigation information and object information;

a plurality of second data groups each including a plurality of the first data groups; and management information including a plurality of first reproduction prohibit information, each indicating a permission or prohibition of special reproduction of a respective one of the second data groups by the reproducing apparatus.

15. The information record medium according to claim 14, wherein a plurality of the second data groups forms at least one third data group, and wherein the management information is recorded for a respective one of the third data groups.

16. The information record medium according to claim 14, wherein the navigation information includes second reproduction prohibit information indicating permission or prohibition of special reproduction by the reproducing apparatus.

17. The information record medium according to claim 14, wherein the object information is at least one of video information, audio information and sub-picture information.

18. The information record medium according to claim 14, wherein the special reproduction is at least one of time search, chapter search, forward scan and backward scan.

19. An information recording apparatus for recording information onto an information record medium, the information recording apparatus comprising:

object information generating means for generating object information to be recorded;

navigation information generating means for generating navigation information;

management information generating means for generating management information including a plurality of first reproduction prohibit information, each indicating a permission or prohibition of special reproduction by the reproducing apparatus; and recording means for recording the object information and the navigation information in a plurality of first data groups, and for recording the management information.

20. The apparatus according to claim 19, wherein a plurality of the first data groups forms a plurality of second data groups, and a plurality of the second data groups forms a third data group, and wherein the management information generating means generates the management information for a respective one of the third data groups.

21. The apparatus according to claim 19, wherein the navigation information includes second reproduction prohibit information indicating permission or prohibition of special reproduction by the reproducing apparatus.

22. The apparatus according to claim 19, wherein the object information is at least one of video information, audio information and sub-picture information.

23. The apparatus according to claim 19, wherein the special reproduction is at least one of time search, chapter search, forward scan and backward scan.

24. An information reproducing apparatus for reproducing information recorded on an information record medium comprising a plurality of first data groups each including navigation information and object information; a plurality of second data groups each including a plurality of the first data groups; and management information including a plurality of first reproduction prohibit information, each indicating a permission or prohibition of special reproduction of a respective one of the second data groups by the apparatus, the apparatus comprising:

reading means for reading information recorded on the information record medium;

reproduction means for reproducing the information read by the reading means;

instruction means for instructing special reproduction;

detection means for detecting the management information from the information read by the read means; and control means for permitting the special reproduction when the first reproduction prohibit information indicates that the special reproduction is permitted, and for prohibiting the special reproduction when the first reproduction prohibit information indicates that the special reproduction is prohibited.

25. The apparatus according to claim 24, wherein the information record medium further comprises at least one third group including a plurality of the second data groups, and the management information is recorded for a respective one of the third data groups.

26. The apparatus according to claim 24, wherein the navigation information includes second reproduction prohibit information indicating permission or prohibition of special reproduction by the apparatus; and wherein:

the apparatus further comprises second detection means for detecting the second reproduction prohibit information from the information read by the reading means, and the control means prohibits the special reproduction when the second reproduction prohibit information indicates that the special reproduction is prohibited.

27. The apparatus according to claim 24, wherein the object information is at least one of video information, audio information and sub-picture information.

28. The apparatus according to claim 24, further comprising specifying means for specifying a position from which reproduction is to be started;

wherein the control means controls the read means and the reproduction means so that reproduction is started from the specified position when the first reproduction prohibit information indicates that the special reproduction is permitted.

29. The apparatus according to claim 25, wherein the special reproduction is at least one of time search, chapter search, forward scan and backward scan.

* * * * *